(12) United States Patent
Onodera

(10) Patent No.: US 6,828,957 B2
(45) Date of Patent: Dec. 7, 2004

(54) HAPTIC-SENSE-GENERATION INPUT DEVICE THAT IS REDUCED IN SIZE BY A GEAR MECHANISM

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 153 days.

(21) Appl. No.: 10/188,376

(22) Filed: Jul. 2, 2002

(65) Prior Publication Data

US 2003/0006958 A1 Jan. 9, 2003

(30) Foreign Application Priority Data

Jul. 5, 2001 (JP) .................................... 2001-204856

(51) Int. Cl.[7] ................................................ G09G 5/00
(52) U.S. Cl. ...................... 345/156; 345/184; 362/100
(58) Field of Search ........................... 345/184, 156, 345/701, 702; 362/100; 292/356

(56) References Cited

U.S. PATENT DOCUMENTS 6,154,201 A * 11/2000 Levin et al. ................. 345/184
6,636,197 B1 * 10/2003 Goldenberg et al. ........ 345/156

* cited by examiner

Primary Examiner—Jimmy H. Nguyen
(74) Attorney, Agent, or Firm—Brinks Hofer Gilson & Lione

(57) ABSTRACT

A haptic-sense-generation input device is provided with a manipulation knob, a shaft that holds the manipulation knob and is held rotatably by a bearing, a motor having a motor shaft that is parallel with the shaft, a rotation detecting unit for detecting a rotation angle of the manipulation knob, a first gear that is attached to the shaft so as to be rotated by the manipulation knob, and a second gear that is attached to the motor shaft and is rotated by the first gear. A haptic sense that is generated by the motor is transmitted to the manipulation knob via the first gear and the second gear.

17 Claims, 5 Drawing Sheets

HAPTIC-SENSE-GENERATION INPUT DEVICE THAT IS REDUCED IN SIZE BY A GEAR MECHANISM

BACKGROUND OF THE INVENTION

1. Field of the Invention

The present invention relates to a haptic-sense-generation input device that is particularly suitable for use in vehicles.

2. Description of the Related Art

FIG. 8 shows a conventional haptic-sense-generation input device in which the main part is shown in cross section. FIG. 9 is a sectional view taken along line 9—9 in FIG. 8.

A body 51 is a generally rectangular parallelepiped box made of a synthetic resin and is formed by molding. The body 51 is composed of a circumferential side wall 51a, a top wall 51b that is provided above the side wall 51a, a circular opening 51c that is formed in the top wall 51b, a first holding portion 51d that projects inward from the top wall 51b, a bottom wall 51e that is provided below the side wall 51a, and a generally cylindrical second holding portion 51f that extends inward from the bottom wall 51e.

The opening 51c and the second holding portion 51f are opposed to each other. The body 51 has a relatively large volume.

A motor 52 has a generally cylindrical base portion 52a and a motor shaft 52b that projects from the base portion 52a. The motor 52 is provided in such a manner that a rear portion of the base portion 52a is housed in and held by the second holding portion 51f and the motor shaft 52b projects outward through the opening 51c. The motor 52 is of a large size because it is required to generate a prescribed, relatively high torque.

A manipulation knob 53 is made of a synthetic resin and is formed by molding. The manipulation knob 53 is composed of a generally cylindrical manipulating portion 53a, a cylindrical fixing portion 53b that is provided inside the manipulating portion 53a and projects from the center of the manipulating portion 53a, an annular brim 53c that extends outward from the bottom of the manipulating portion 53a perpendicularly to the axis of the fixing portion 53b, and a cylindrical first pulley 53d that extends from a radial position, close to its outer periphery, of the brim 53c so as to be concentric with the fixing portion 53b.

The motor shaft 52b of the motor 52 is directly inserted in the cylindrical fixing portion 53b of the manipulation knob 53, and the motor shaft 52b is fixed to the fixing portion 53b by press fitting or screwing, for example.

When the manipulation knob 53 is attached, the manipulating portion 53a and the brim 53c are located outside the body 51 and the first pulley 53d is located inside the body 51.

A coding member 54 is composed of a disc-shaped rotator 54a, a support shaft 54b that penetrates through the center of the rotator 54a and extends in the vertical direction that is perpendicular to the rotator 54a, a plurality of slits 54c that are formed in the rotator 54a so as to be arranged concentrically with the support shaft 54b, and a disc-shaped second pulley 54d that expends from a prescribed position of the support shaft 54b parallel with the rotator 54a.

One end portion of the support shaft 54b of the coding member 54 is rotatably attached to the first holding portion 51d of the body 51, whereby the rotator 54a can rotate. In this state, the support shaft 54b of the coding member 54 is parallel with the motor shaft 52b of the motor 52 and the second pulley 54d of the coding member 54 is flush with the first pulley 53d of the manipulation knob 53.

A photointerrupter 56 has a light-emitting element 56a and a photodetector 56b, and has a function that light that is emitted by the light-emitting element 56a is detected by the photodetector 56b. The photointerrupter 56 is provided in such a manner that the rotator 54a having the slits 54c is interposed between the light-emitting element 56a and the photodetector 56b. As the rotator 54a rotates, the photodetector 56a intermittently detects light that is emitted by the light-emitting element 56a.

That is, the photointerrupter 56 and the coding member 54 constitute a rotation detecting means for detecting a rotation angle of the manipulation knob 53.

A belt 55 is made of elastic rubber or a metal and has a ring shape. The belt 55 is wound on the first pulley 53d and the second pulley 54d, whereby the first pulley 53d and the second pulley 54d rotate in link with each other. That is, the belt 55 causes the motor shaft 53b of the motor 52 and the rotator 54a of the coding member 54 to rotate in link with each other.

A push-button switch 57 is composed of a base portion 57a and a push button 57b that projects from the base portion 57a. The push-button switch 57 is provided close to the motor 52 at such a position that the push button 57b is opposed to a tip portion of the first pulley 53d of the manipulation knob 53. When the first pulley 53d is manipulated in the axial direction, the push-button switch 57 is pushed (manipulated) by the tip portion of the first pulley 53d. That is, when the manipulation knob 53 is depressed in the axial direction, it is moved in the axial direction together with the motor shaft 52b, whereby the push-button switch 57 is manipulated.

A controller 58, which is a central processing unit (CPU), for example, produces a prescribed output signal when receiving a prescribed input signal. The output signal is used for controlling a haptic sense that is generated by the motor 52.

For example, when a proper output signal is output from the controller 58, the motor shaft 52b of the motor 52 is driven so as to produce a desired haptic sense. The haptic sense that is transmitted to the manipulation knob 53 can be changed depending on how the motor shaft 52b is driven.

Function selection switches 59 are a plurality of push-button switches, for example. A desired function can be selected by manipulating one of the push-button switches.

Output signals of the respective function switches 59 are input to the controller 58. For example, by using the function selection switches 59, selection can be made among such functions as tuning of a radio receiver, song selection of a compact disc (CD) player, and route setting of a navigation system. The function selection switches 59 are provided at prescribed locations.

The motor 52 generates a prescribed haptic sense based on an output signal of each of the function selection switches 59.

A monitor 60 is a liquid crystal display device, for example, and has a display screen. The monitor 60 is provided at a prescribed location and performs display that relates to a desired function based on a control signal for the desired function that is supplied from the controller 58.

Next, the operation of the above-configured conventional haptic-sense-generation input device will be described. A control signal for generating a haptic sense corresponding to a function that has been selected by manipulating one of the function selection switches 59 is input to the motor 52. Based on the control signal, the motor 52 generates a prescribed haptic sense, which is transmitted to the manipulation knob 53 that is directly attached to the motor shaft 52b of the motor 52.

A more specific operation of the conventional haptic-sense-generation input device that is performed in tuning in to a radio broadcast will be described below. First, one of the function selection switches 59 that is provided for a function of tuning in to a radio broadcast is manipulated.

In response, the controller 58 inputs, to the motor 52, a control signal for generating a haptic sense that corresponds to the function of tuning in to a radio broadcast. Based on the control signal, the motor 52 generates a prescribed haptic sense that corresponds to the function of tuning in to a radio broadcast.

Then, when the manipulation knob 53 is manipulated, the haptic sense is transmitted to the manipulation knob 53 that is directly attached to the motor shaft 52b of the motor 52 and the names of broadcasting station to tune in to such as NHK first, NHK second, TBS, and Nippon Broadcasting System are displayed on the monitor 60.

Then, the manipulation knob 53 is rotated clockwise or counterclockwise so as to tune in to one of the above broadcasting stations. While the manipulation knob 53 is rotated, a rotation angle of the manipulation knob 53 is detected by the rotation detecting means that is composed of the photointerrupter 56 and the coding member 54, whereby the radio receiver can be tuned to the desired broadcasting station.

However, in the conventional haptic-sense-generation input device, the manipulation knob 53 is directly attached to the motor shaft 52b of the motor 52 and a haptic sense that is generated by the motor 52 is transmitted to the manipulation knob 53 directly.

Nowadays, haptic-sense-generation input devices capable of generating strong haptic senses are desired. To satisfy this requirement, it is necessary to use a large-sized motor 52 capable of producing high torque. This results in problems that the large-sized motor 52 is costly and makes the haptic-sense-generation input device larger and heavier.

SUMMARY OF THE INVENTION

The present invention has been made to solve the above circumstances, and an object of the invention is therefore to provide a haptic-sense-generation input device that is reduced in size and weight.

A haptic-sense-generation input device according to the invention comprises a manipulation knob; a shaft that holds the manipulation knob and is held rotatably by a bearing; a motor having a motor shaft that is parallel with the shaft; rotation detecting means for detecting a rotation angle of the manipulation knob; a first gear that is attached to the shaft so as to be rotated by the manipulation knob; and a second gear that is attached to the motor shaft and is rotated by the first gear, wherein a haptic sense that is generated by the motor is transmitted to the manipulation knob via the first gear and the second gear.

With this configuration, the motor can be reduced in size and weight as well as in cost while strong haptic senses can be obtained. Further, the haptic-sense-generation input device as a whole can be reduced in size and weight.

In the haptic-sense-generation input device according to the invention, the rotation detecting means comprises a rotator and a rotatable support shaft that holds the rotator and is parallel with the shaft and the motor shaft, and a third gear that is rotated by the first gear to manipulate the rotation detecting means is further provided.

With this configuration, since the third gear is rotated by the first gear, a slip is less likely to occur that in the conventional device in which the rotation detecting means uses a belt; the gear rotation is made reliable and stable.

In the haptic-sense-generation input device according to the invention, the first gear is an internal gear and the second gear and the third gear are engaged with the internal gear.

With this configuration, since the second and third gears having prescribed gear ratios with respect to the first gear are rotated by the first gear, the gear rotation is made stable while the haptic-sense-generation input device is reduced in size.

In the haptic-sense-generation input device according to the invention, the manipulation knob is formed with the first gear that is the internal gear.

With this configuration, the first gear can be formed easily and the cost of the haptic-sense-generation input device can be reduced accordingly.

The haptic-sense-generation input device according to the invention further comprises a fourth gear that is engaged with the internal gear.

With this configuration, since the internal gear is engaged with the second, third, and fourth gears, the internal gear is pulled toward the fourth gear by the fourth gear itself. Therefore, the second and third gears rotate being engaged with the internal gear reliably and hence the internal gear can rotate stably.

In the haptic-sense-generation input device according to the invention, the second gear, the third gear, and the fourth gear are located at the respective apices of an equilateral triangle.

With this configuration, the rotation of the internal gear is made more stable.

In the haptic-sense-generation input device according to the invention, the shaft is movable in an axial direction thereof, and a push-button switch that is manipulated when the shaft is moved in the axial direction and a printed wiring board that is mounted with the push-button switch are further provided.

With this configuration, the push-button switch can be manipulated stably and attached easily while the cost of the haptic-sense-generation input device is reduced.

The haptic-sense-generation input device according to the invention further comprises an illumination lamp mounted on a printed wiring board, for illuminating the manipulation knob.

With this configuration, the manipulation knob can be illuminated by the illumination lamp and the illumination lamp can be attached easily while the cost of the haptic-sense-generation input device is reduced.

In the haptic-sense-generation input device according to the invention, the printed wiring board is a single printed wiring board that is mounted with the push-button switch, the illumination lamp, and the rotation detecting means.

With this configuration, since the above components are mounted on the single printed wiring board, they can be attached easily while the cost of the haptic-sense-generation input device is reduced.

In the haptic-sense-generation input device according to the invention, the rotation detecting means is a light transmission type encoder.

With this configuration, the transmission type encoder having a simple structure can be attached easily while the cost of the haptic-sense-generation input device is reduced.

DESCRIPTION OF THE PREFERRED EMBODIMENT

Figure 1:
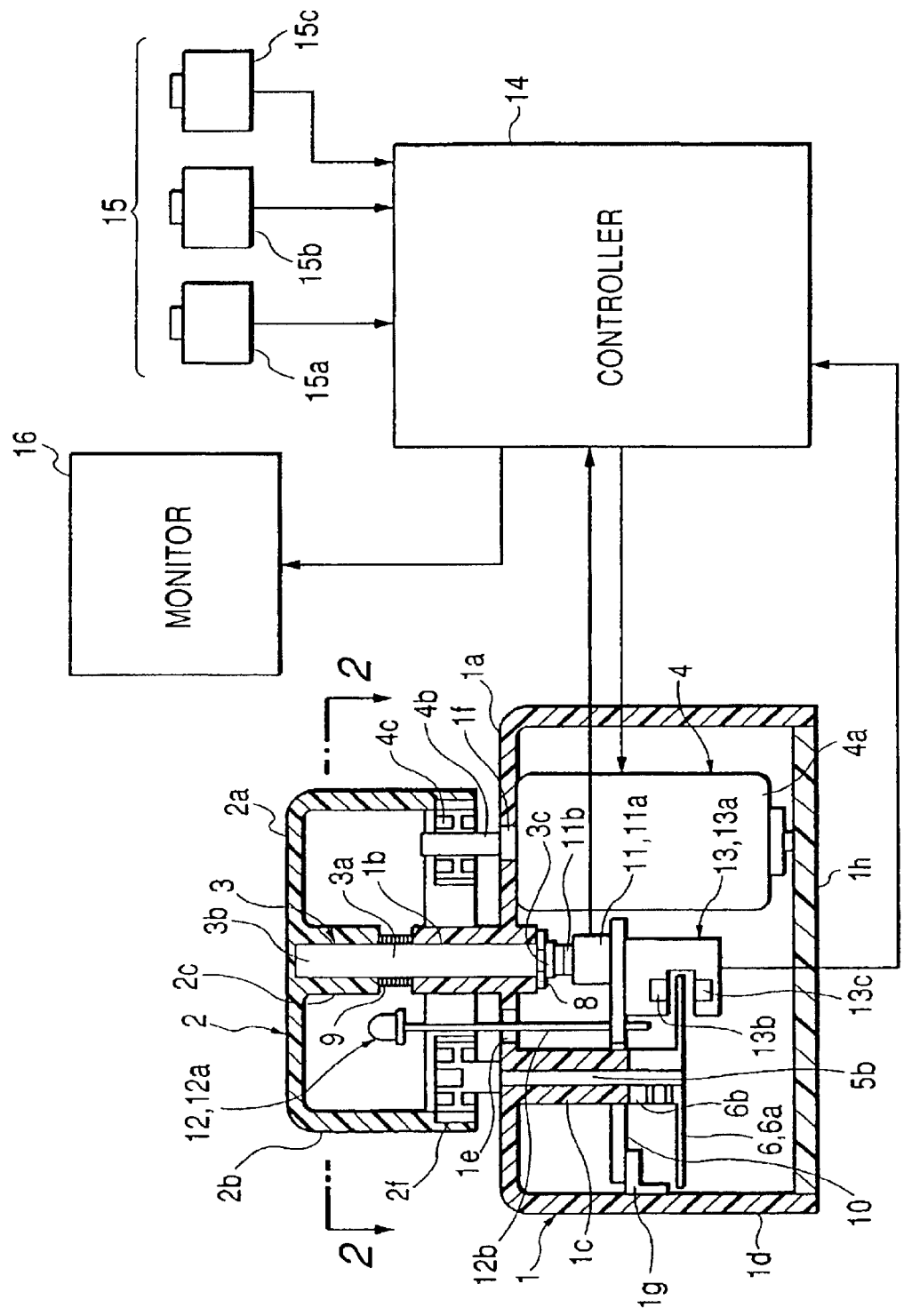
FIG. 1 shows a haptic-sense-generation input device according to an embodiment of the invention in which the main part is shown in cross section.
Figure 2:
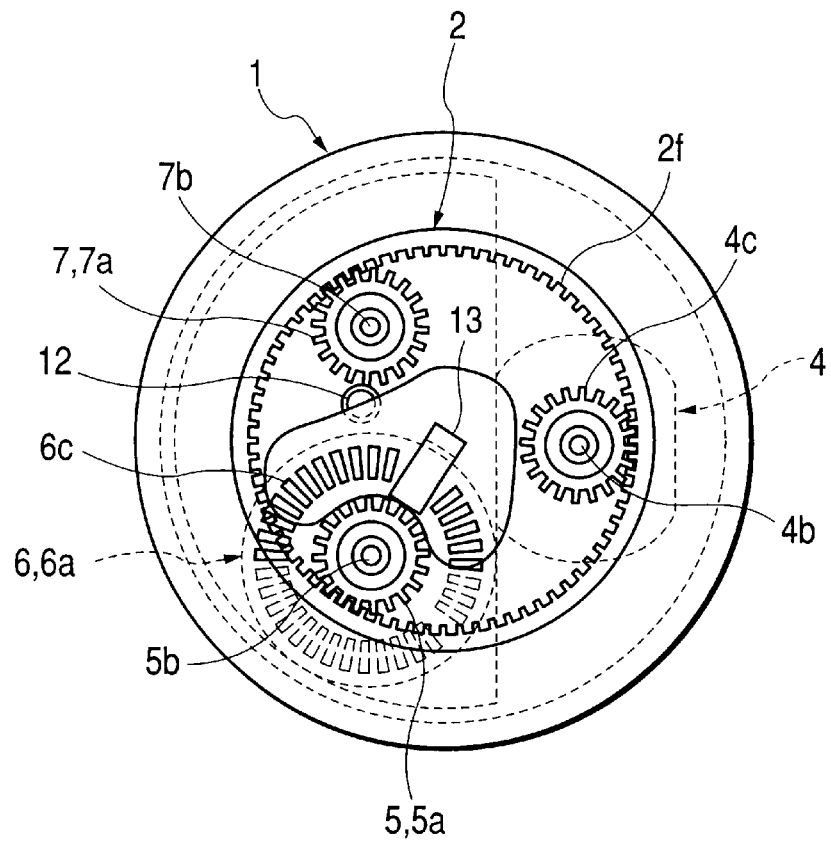
FIG. 2 is a sectional view taken along line 2—2 in FIG. 1.

A haptic-sense-generation input device according to the present invention will be hereinafter described with reference to FIGS. 1 and 2. FIG. 1 shows a haptic-sense-generation input device according to an embodiment of the invention in which the main part is shown in cross section. FIG. 2 is a sectional view taken along line 2—2 in FIG. 1.

A generally cylindrical body 1 is made of a synthetic resin and is formed by molding. The body 1 is composed of a disc-shaped top wall 1a, a cylindrical side wall 1d that extends from the outer periphery of the top wall 1a in the vertical direction, a first bearing 1b that is provided at the center of the top wall 1a so as to project outward, a second bearing 1c that projects inward from the top surface 1a, a through-hole 1e that is formed through the top wall 1a, a fixing hole 1f that is formed through the top wall 1a, a support portion 1g that projects inward from a prescribed position of the side wall 1d, and a lid 1h that closes the opening of the side wall 1d. The body 1 has a relatively small volume.

A generally cylindrical manipulation knob 2 is made of a synthetic resin and is formed by molding. The manipulation knob 2 is composed of a disc-shaped top wall 2a, a cylindrical side wall 2b that extends from the outer periphery of the top wall 2a in the vertical direction, and a holding portion 2c that projects inward from the center of the top wall 2a.

The bottom portion of the inner surface of the side wall 2b of the manipulation knob 2 is provided with a first gear 2f that is an internal gear having a large diameter. The first gear 2f has a relatively large number of teeth.

A cylindrical rotary shaft 3 is made of a metal and is formed by cutting. The rotary shaft 3 is composed of a base portion 3a, a fixing portion 3b that is provided on one side of the base portion 3a, a groove portion 3c that is provided on the other side of the base portion 3a.

The rotary shaft 3 is integrated with the manipulation knob 2 by insert molding (the fixing portion 3b is inserted in the holding portion 2c). The base portion 3a of the rotary shaft 3 is inserted in and held by the first bearing 1b of the body 1 in a rotatable manner, and the groove portion 3c of the rotary shaft 3 projects from the first bearing 1b. The rotary shaft 3 serves as a shaft portion. The rotary shaft 3 may be fixed to the manipulation knob 2 by a fixing means such as a screw.

The groove portion 3c of the rotary shaft 3 is fitted in a fixing member 8 which is what is called a C-shaped washer, whereby the rotary shaft 3 is prevented from falling off the first bearing 1b.

The rotary shaft 3 is inserted in a resilient member 9 which is a coiled spring, and the resilient member 9 is interposed between the tip surface of the holding portion 2c of the manipulation knob 2 and the tip surface of the first bearing 1b of the body 1. The resilient force of the resilient member 9 urges the manipulation knob 2 outward (upward). The manipulation knob 2 thus urged can not only rotate but also move in the axial direction of the rotary shaft 3 together with the rotary shaft 3.

A motor 4 has a generally cylindrical base portion 4a, a motor shaft 4b that projects upward from the base portion 4a, and a second gear 4c (spur gear) that is attached to the motor shaft 4b. One end portion of the base portion 4a is attached to the fixing hole 1f by a proper means, and the motor shaft 4b projects outward from the fixing hole 1f.

The second gear 4c is smaller in diameter than the first gear 2f. When the motor 4 is attached to the body 1, the second gear 4c of the motor 4 is located inside the first gear 2f of the manipulation knob 2, oriented parallel with it, and engaged with it. The motor shaft 4b of the motor 4 is parallel with the rotary shaft 3 of the manipulation knob 2.

With the above structure, a haptic sense generated by the motor 4 is transmitted to the manipulation knob 2 via the second gear 4c and the first gear 2f that are in mesh.

Since the motor 4 rotates the manipulation knob 2 via the second gear 4c and the first gear 2f that are in mesh, the torque that is transmitted from the motor 4 to the manipulation knob 2 can easily be changed by changing the gear ratio between the gears 4c and 2f. Therefore, even if the motor 4 generates a prescribed, relatively low torque, high torque can be given to the manipulation knob 2; the motor 4 can be miniaturized.

A third gear 5 is made of a synthetic resin and is formed by molding. The third gear 5 is composed of a spur gear 5a and a support shaft 5b that projects from the center of the spur gear 5a perpendicularly to the spur gear 5a.

The third gear 5 is attached to the body 1 rotatably in such a manner that the support shaft 5b is inserted in the second bearing 1c of the body 1. The tip portion of the support shaft 5b projects downward from the second bearing 1c.

The third gear 5 deviates from the second gear 4c by 120° about the center of the first bearing 1b. The spur gear 5a of the third gear 5 is smaller in diameter than the first gear 2f and is located inside the first gear 2f. The spur gear 5a is parallel with the first gear 2f and is engaged with it.

When the third gear 5 is attached to the body 1, the spur gear 5a is engaged with the first gear 2f of the manipulation knob 2. Therefore, the spur gear 5a of the third gear 5 rotates as the first gear 2f rotates.

A fourth gear 7 is made of a synthetic resin and is formed by molding. The fourth gear 7 is composed of a spur gear 7a and a support shaft 7b that projects from the center of the spur gear 7a perpendicularly to the spur gear 7a. The support portion 7b of the fourth gear 7 is attached to the top wall 1a of the body 1 rotatably by a proper means.

The fourth gear 7 deviates from the second gear 4c by 120° about the center of the first bearing 1b. The spur gear 7a of the fourth gear 7 is smaller in diameter than the first gear 2f and is located inside the first gear 2f. The spur gear 7a is parallel with the first gear 2f and is engaged with it.

That is, the second gear 4c, the third gear 5, and the fourth gear 7 are located at the respective apices of an equilateral triangle whose center is located on the axis of the first bearing 1b and the rotary shaft 3 that is inserted in the first bearing 1b.

Each of the spur gears of the second, third, and fourth gears 4c, 5, and 7 is engaged with the first gear 2f that is an internal gear and, as mentioned above, the second, third, and fourth gears 4c, 5, and 7 are located at the respective apices of an equilateral triangle. The first gear 2f is pulled toward the fourth gear 7 by the fourth gear 7 itself. Therefore, the second gear 4c and the third gear 5 rotate while being engaged with the first gear 2f (internal gear) reliably, and hence the first gear 2f rotates without slipping.

A coding member 6 is composed of a disc-shaped rotator 6a, a support shaft 6b that extends upward from the center of the rotator 6a perpendicularly to the rotator 6a and that supports the rotator 6a, and a plurality of (e.g., 40) slits 6c that are formed in the rotator 6a so as to extend in the radial direction and be arranged concentrically with the support shaft 6b.

The tip portion of the support shaft 5b of the third gear 5 is inserted in the support shaft 6b of the coding member 6 and fixed to the support shaft 5b by a proper means (e.g., by screwing), whereby the coding member 6 can rotate on the support shaft 6b. With this structure, the coding member 6 is rotated (manipulated) by rotation of the third gear 5.

A printed wiring board 10 is such that a prescribed circuit pattern (not shown) is formed on at least one of the surfaces of a single flat plat board. The printed wiring board 10 is attached to the support portion 1g of the body 1 by screwing, for example, and is thus provided in the body 1.

A photointerrupter 13 is composed of a base portion 13a, a light-emitting element 13b that is attached to the base portion 13a, and a photodetector 13c that is attached to the base portion 13a so as to be opposed to the light-emitting element 13b. The photointerrupter 13 has a function that light that is emitted by the light-emitting element 13b is detected by the photodetector 13c.

The photointerrupter 13 is provided in such a manner that the rotator 6a, having the slits 6c, of the coding member 6 is interposed between the light-emitting element 13b and the photodetector 13c. As the rotator 6a of the coding member 6 rotates, the photodetector 13c intermittently detects light that is emitted by the light-emitting element 13b.

That is, the photointerrupter 13 and the coding member 6 constitute a light transmission type encoder as a rotation detecting means for detecting a rotation angle of the manipulation knob 2.

The photointerrupter 13 is mounted on the printed wiring board 10 and is connected to the circuit pattern formed thereon.

A push-button switch 11 is composed of a base portion 11a and a push button 11b that projects upward from the base portion 11a. The push-button switch 11 is provided at such a position that the push button 11b is opposed to the tip portion of the rotary shaft 3.

The push-button switch 11 is mounted on the printed wiring board 10 and is provided so as to be manipulated when the rotary shaft 3 that holds the manipulation knob 2 is moved in its axial direction. That is, when the manipulation knob 2, and hence the rotary shaft 3, is moved in the axial direction, the tip portion of the rotary shaft 3 manipulates the push button 11b of the push-button switch 11.

An illumination lamp 12, which is a light-emitting diode (LED), for example, is composed of a light-emitting portion 12a and a terminal 12b that extends downward from the light-emitting portion 12a. The light-emitting portion 12a of the illumination lamp 12 is housed in the manipulation knob 2, and the terminal 12b is mounted on the printed wiring board 10 and is connected to the circuit pattern formed thereon.

Therefore, when the light-emitting portion 12a emits light, the manipulation knob 2 is illuminated from inside.

As described above, the push-button switch 11, the illumination lamp 12, and the rotation detecting means that consists of the photointerrupter 13 and the coding member 6 are mounted on the single printed wiring board 10.

A controller 14, which is a central processing unit (CPU), for example, produces a prescribed output signal (e.g., a signal to be supplied to the motor 4) when receiving a prescribed input signal (e.g., a signal supplied from the photointerrupter 13 or the push-button switch 11). The output signal is used for controlling a haptic sense that is generated by the motor 4.

For example, when a proper output signal is output from the controller 14, the motor shaft 4b of the motor 4 is driven so as to produce a desired haptic sense. The haptic sense that is transmitted to the manipulation knob 2 can be changed depending on how the motor shaft 4b is driven.

For example, function selection switches 15 are a plurality of (e.g., three) push-button switches 15a, 15b, and 15c. A desired function can be selected by manipulating one of the push-button switches 15a, 15b, and 15c. Output signals of the respective function switches 15 are input to the controller 14.

For example, by using the function selection switches 15, selection can be made among such functions as tuning of a radio receiver, song selection of a compact disc (CD) player, and route setting of a navigation system. The function selection switches 15 are provided at prescribed locations.

The motor 4 generates a prescribed haptic sense based on an output signal of each of the function selection switches 15.

A monitor 16 is a liquid crystal display device, for example, and has a display screen. The monitor 16 is provided at a prescribed location and displays a picture that relates to a desired function on the display screen based on a control signal for the desired function that is supplied from the controller 14.

Figure 3:
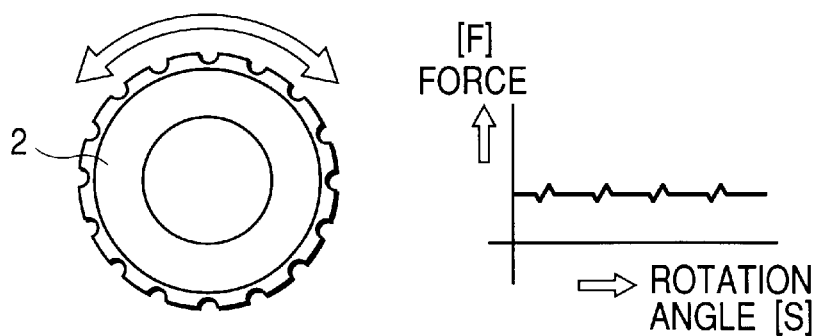
FIG. 3 illustrates a function of the haptic-sense-generation input device according to the embodiment and specifically shows a haptic sense that is generated during a radio tuning operation.
Figure 4:
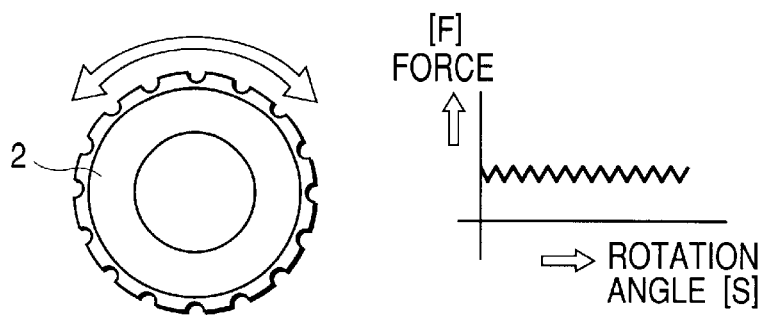
FIG. 4 illustrates another function of the haptic-sense-generation input device according to the embodiment and specifically shows a haptic sense that is generated during a radio sound volume control operation.
Figure 5:
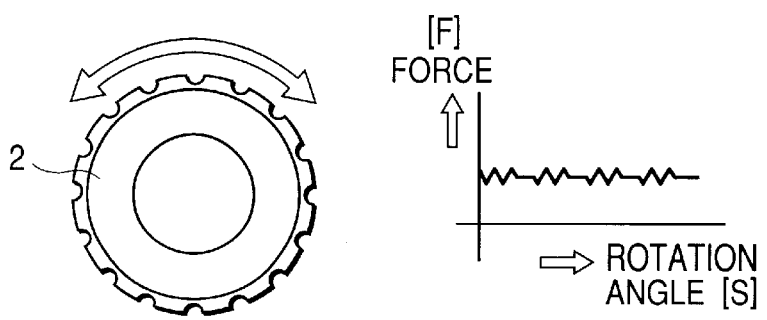
FIG. 5 illustrates still another function of the haptic-sense-generation input device according to the embodiment and specifically shows a haptic sense that is generated during a CD song selection operation.
Figure 6:
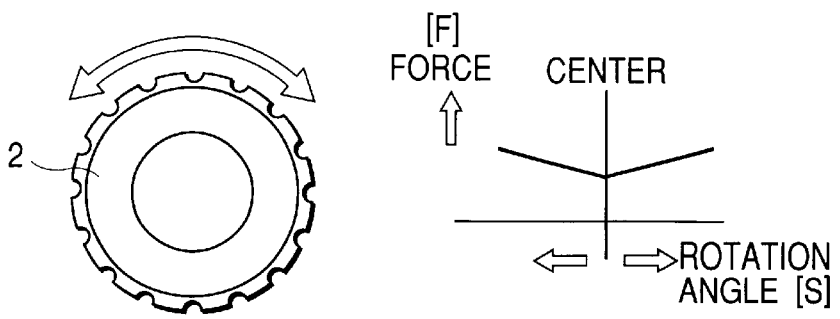
FIG. 6 illustrates a further function of the haptic-sense-generation input device according to the embodiment and specifically shows a haptic sense that is generated during an air-conditioner temperature setting operation.
Figure 7:
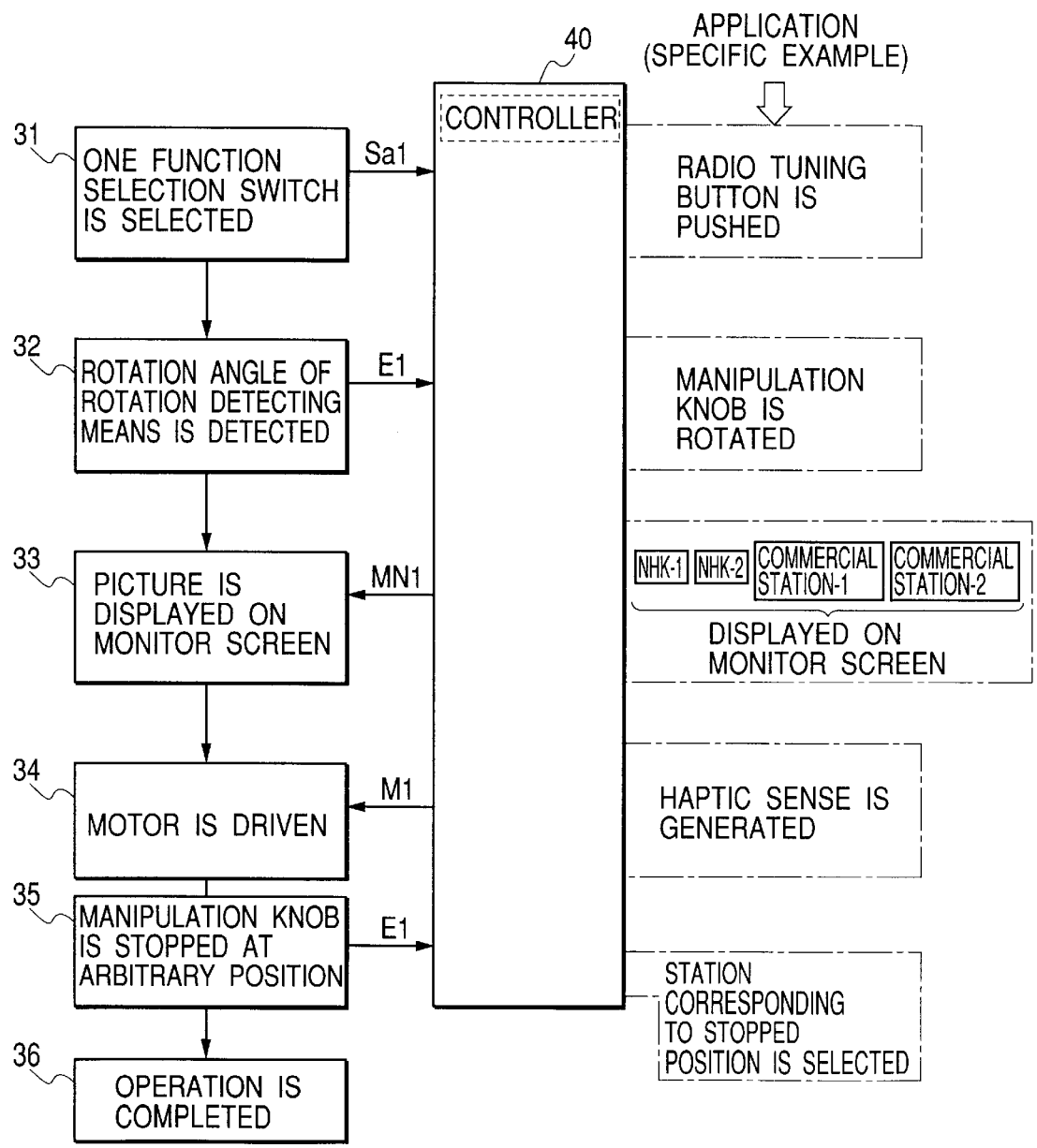
FIG. 7 is a chart showing the radio tuning operation in detail.
Figure 8:
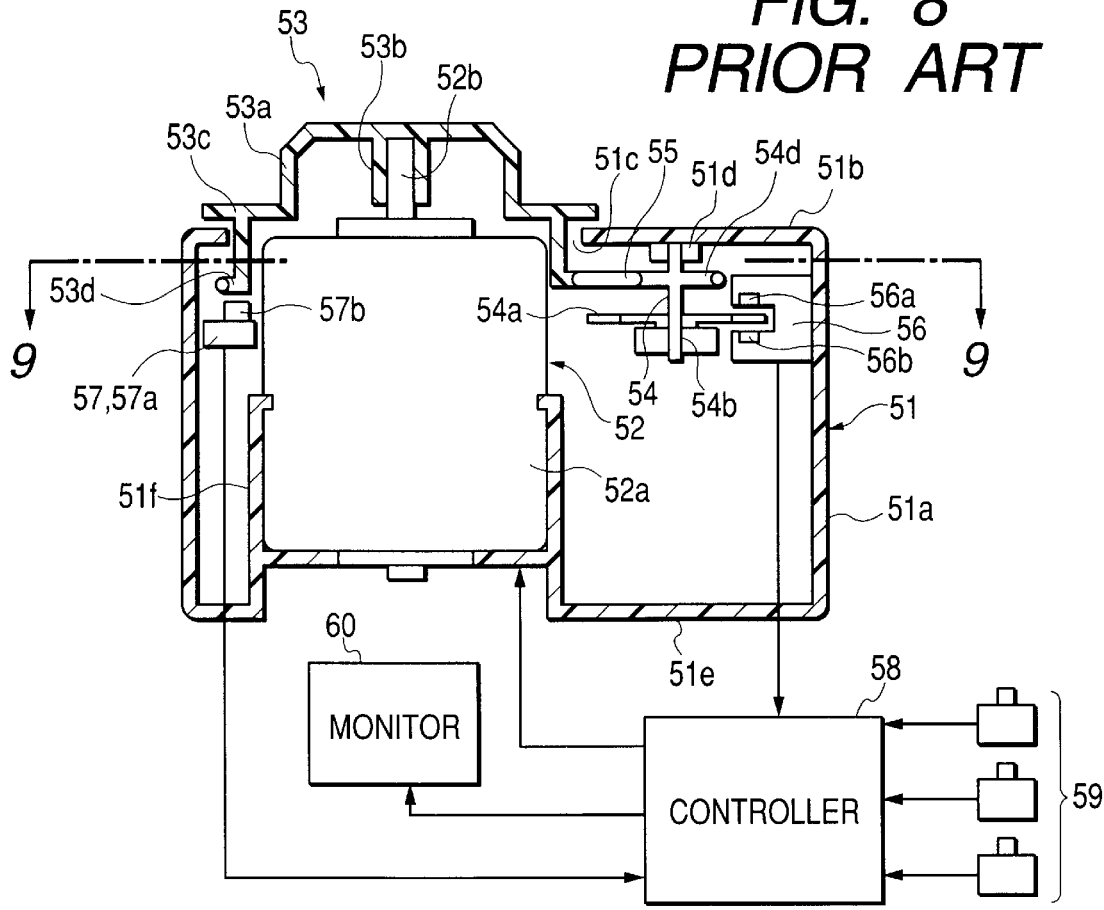
FIG. 8 shows a conventional haptic-sense-generation input device in which the main part is shown in cross section.
Figure 9:
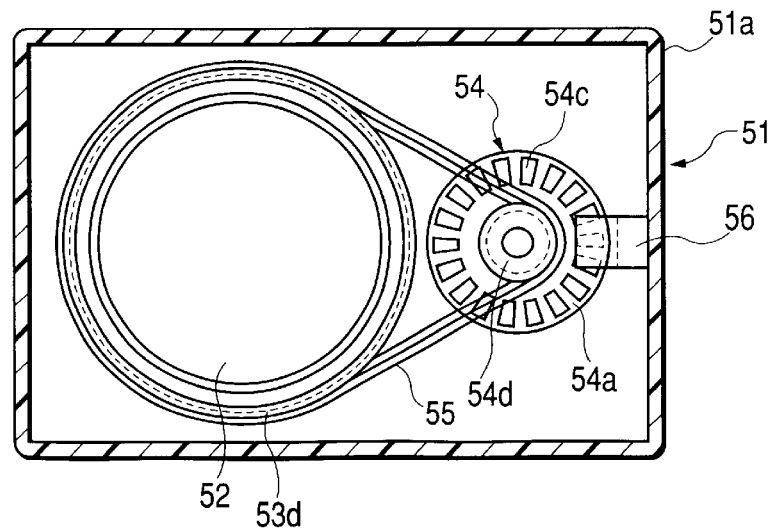
FIG. 9 is a sectional view taken along line 9—9 in FIG. 8.

Next, among the operations of the various functions that are performed by the haptic-sense-generation input device according to the invention, a radio tuning operation, a radio sound volume control operation, a CD song selection operation, and an air-conditioner temperature setting operation will be described with reference to FIGS. 3–7. FIG. 3 illustrates a function of the haptic-sense-generation input device according to the embodiment of the invention and specifically shows a haptic sense that is generated during a radio tuning operation. FIG. 4 illustrates another function of the haptic-sense-generation input device according to the embodiment and specifically shows a haptic sense that is generated during a radio sound volume control operation. FIG. 5 illustrates still another function of the haptic-sense-generation input device according to the embodiment and specifically shows a haptic sense that is generated during a CD song selection operation. FIG. 6 illustrates a further function of the haptic-sense-generation input device according to the embodiment and specifically shows a haptic sense that is generated during an air-conditioner temperature setting operation. FIG. 7 is a chart showing the radio tuning operation in detail.

Each of FIGS. 3–6 outlines an operation that is performed after establishment of a state that a desired function (e.g., a tuning of a radio, song selection of a CD player, or route selection of a navigation system) has been selected by manipulating one of function selection switches 15 that are the plurality of (e.g., three) push-button switches 15a, 15b, and 15c.

First, the radio tuning operation will be described with reference to FIG. 3. As the manipulation knob 2 is rotated clockwise or counterclockwise, the motor 4 (see FIG. 1) is driven by the controller 14 so as to generate, in order, haptic senses that are one-click feels at prescribed intervals. The radio is tuned, in order, to radio stations such as NHK First, NHK Second, TBS, and Nippon Broadcasting System that are assigned to the respective haptic senses.

Next, the radio tuning operation of the haptic-sense-generation input device according to the embodiment as well as related haptic senses that are transmitted to the manipulation knob 2 will be described in detail with reference to FIG. 7.

As shown in FIG. 7, first, one of the function selection switches 15 (push-button switches) corresponding to the function of radio tuning is pushed (selected) (indicated by numeral 31 in FIG. 7), whereupon the controller 14 recognizes that a radio tuning operation should be performed.

Then, a rotation angle of the rotation detecting means that is rotated by rotating the manipulation knob 2 (see FIG. 1) is detected (indicated by numeral 32 in FIG. 7) and the detected rotation angle is input to the controller 14 as a control signal.

Then, a list of radio stations (e.g., NHK First, NHK Second, TBS, and Nippon Broadcasting System) to which the radio can be tuned is displayed on the screen of the monitor 16 based on a monitor control signal that is supplied from the controller 14 (indicated by numeral 33 in FIG. 7).

Then, as the manipulation knob 2 is rotated, the controller 14 supplies the motor 4 with a haptic sense control signal. The motor 4 generates a prescribed haptic sense based on the haptic sense control signal (indicated by numeral 34 in FIG. 7). The generated haptic sense is transmitted to the manipulation knob 2 via the first gear 2f and the second gear 4c. In this manner, the radio is tuned to a desired radio station that is displayed on the screen of the monitor 16.

When the desired radio station (e.g., TBS) has been selected by rotating the manipulation knob 2, the rotation of the knob 2 is stopped (indicated by numeral 35 in FIG. 7) and the manipulation knob 2 is pushed in the axial direction, whereby the push-button switch 11 (see FIG. 1) is turned on to complete the selection of the desired radio station (indicated by numeral 36 in FIG. 7).

Next, the radio sound volume control operation will be described with reference to FIG. 4. As the manipulation knob 2 is rotated clockwise or counterclockwise, the motor 4 is driven by the controller 14 so as to generate, on the manipulation knob 2, haptic senses that are consecutive one-click feels. The radio sound volume is increased or decreased every haptic sense.

Next, the CD song selection operation will be described with reference to FIG. 5. As the manipulation knob 2 is rotated clockwise or counterclockwise, the motor 4 is driven by the controller 14 so as to generate, on the manipulation knob 2, haptic senses that are two-click feels at prescribed intervals. For example, a first song, a second song, . . . , and an eighth song of a CD are selected in association with the respective haptic senses.

Next, the air-conditioner temperature setting operation will be described with reference to FIG. 6. As the manipulation knob 2 is rotated clockwise or counterclockwise, the motor 4 is driven by the controller 14 so as to generate, on the manipulation knob 2, a haptic sense that is a torque feel. The torque feel becomes stronger as the manipulation knob 2 is rotated clockwise or counterclockwise from the center position (see FIG. 6). The temperature of the air-conditioner is set by using the torque feel on the manipulation knob 2.

The radio sound volume control operation, the CD song selection operation, and the air-conditioner temperature setting operation will not be described any further because they are almost the same as the radio tuning operation that was described above with reference to FIG. 7.

In the haptic-sense-generation input device according to the embodiment, the first gear 2f is engaged with the three gears, that is, the second, third, and fourth gears 4c, 5, and 7, that are located at the respective apices of an equilateral triangle. However, the invention is not limited to such a case. The three gears may be located at the respective apices of a triangle that is not an equilateral triangle. As a further alternative, the first gear 2f may be engaged with two gears.

In the haptic-sense-generation input device according to the embodiment, the first gear 2f of the manipulation knob 2 that is an internal gear is engaged with the second gear 4c that is a spur gear and is attached to the motor shaft 4b. However, the invention is not limited to such a case. The first gear 2f that is engaged with the second gear 4c may be a spur gear.

As described above, the haptic-sense-generation input device according to the invention comprises the manipulation knob shaft and the motor shaft that are parallel with each other, the first gear that is attached to the manipulation knob shaft so as to be rotated by the manipulation knob, and the second gear that is attached to the motor shaft and is rotated by the first gear, wherein a haptic sense that is generated by the motor is transmitted to the manipulation knob via the first gear and the second gear. With this configuration, the motor can be reduced in size and weight as well as in cost while strong haptic senses can be obtained. Further, the haptic-sense-generation input device as a whole can be reduced in size and weight.

In the haptic-sense-generation input device according to the invention, the first gear is an internal gear and the second gear and the third gear are engaged with the internal gear. Since the second and third gears having prescribed gear ratios with respect to the first gear are rotated by the first gear, the gear rotation is made stable while the haptic-sense-generation input device is reduced in size.

In the haptic-sense-generation input device according to the invention, the second gear, the third gear, and the fourth gear are located at the respective apices of an equilateral triangle. This makes the rotation of the internal gear more stable.

What is claimed is:

1. A haptic-sense-generation input device comprising:
   a manipulation knob;
   a shaft that holds the manipulation knob and is held rotatably by a bearing;
   a motor having a motor shaft that is parallel with the shaft;
   a rotation detector that detects a rotation angle of the manipulation knob;
   a first gear that is attached to the shaft so as to be rotated by the manipulation knob; and
   a second gear that is attached to the motor shaft and is rotated by the first gear,
   wherein a haptic sense that is generated by the motor is transmitted to the manipulation knob via the first gear and the second gear.

2. The haptic-sense-generation input device according to claim 1, wherein the rotation detector comprises a rotator and a rotatable support shaft that holds the rotator and is parallel with the shaft and the motor shaft, and wherein the haptic-sense-generation input device further comprises a third gear that is rotated by the first gear to manipulate the rotation detector.

3. The haptic-sense-generation input device according to claim 2, wherein the first gear is an internal gear, and the second gear and the third gear are engaged with the internal gear.

4. The haptic-sense-generation input device according to claim 3, wherein the manipulation knob is formed with the first gear that is the internal gear.

5. The haptic-sense-generation input device according to claim 4, further comprising an illumination lamp mounted on a printed wiring board, for illuminating the manipulation knob.

6. The haptic-sense-generation input device according to claim 5, wherein the shaft is movable in an axial direction thereof, wherein the haptic-sense-generation input device further comprises a push-button switch that is manipulated when the shaft is moved in the axial direction, and wherein the printed wiring board is a single printed wiring board that is mounted with the push-button switch, the illumination lamp, and the rotation detector.

7. The haptic-sense-generation input device according to claim 6, wherein the rotation detector is a light transmission type encoder.

8. The haptic-sense-generation input device according to claim 3, further comprising a fourth gear that is engaged with the internal gear.

9. The haptic-sense-generation input device according to claim 8, wherein the second gear, the third gear, and the fourth gear are located at respective apices of an equilateral triangle.

10. The haptic-sense-generation input device according to claim 4, further comprising a fourth gear that is engaged with the internal gear.

11. The haptic-sense-generation input device according to claim 10, wherein the second gear, the third gear, and the fourth gear are located at respective apices of an equilateral triangle.

12. The haptic-sense-generation input device according to claim 11, wherein the rotation detector is a light transmission type encoder.

13. The haptic-sense-generation input device according to claim 3, wherein the shaft is movable in an axial direction thereof, and wherein the haptic-sense-generation input device further comprises a push-button switch that is manipulated when the shaft is moved in the axial direction, and a printed wiring board that is mounted with the push-button switch.

14. The haptic-sense-generation input device according to claim 3, wherein the rotation detector is a light transmission type encoder.

15. The haptic-sense-generation input device according to claim 1, wherein the shaft is movable in an axial direction thereof, and wherein the haptic-sense-generation input device further comprises a push-button switch that is manipulated when the shaft is moved in the axial direction, and a printed wiring board that is mounted with the push-button switch.

16. The haptic-sense-generation input device according to claim 15, further comprising an illumination lamp mounted on a printed wiring board, for illuminating the manipulation knob, wherein the printed wiring board is a single printed wiring board that is mounted with the push-button switch, the illumination lamp, and the rotation detector.

17. The haptic-sense-generation input device according to claim 1, wherein the rotation detector is a light transmission type encoder.

* * * * *